US009951635B2

(12) United States Patent
Guemmer

(10) Patent No.: US 9,951,635 B2
(45) Date of Patent: Apr. 24, 2018

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 489 days.

(21) Appl. No.: 14/659,854

(22) Filed: Mar. 17, 2015

(65) Prior Publication Data

US 2015/0267546 A1    Sep. 24, 2015

(30) Foreign Application Priority Data

Mar. 20, 2014 (DE) .................. 10 2014 205 226

(51) Int. Cl.
*F01D 9/04* (2006.01)
*F01D 5/14* (2006.01)
(Continued)

(52) U.S. Cl.
CPC ............ *F01D 9/041* (2013.01); *F01D 5/146* (2013.01); *F01D 9/00* (2013.01); *F01D 9/02* (2013.01);
(Continued)

(58) Field of Classification Search
CPC . F01D 9/041; F01D 9/042; F01D 9/02; F01D 9/00; F01D 25/24; F01D 25/246;
(Continued)

(56) References Cited

U.S. PATENT DOCUMENTS 2,663,493 A    12/1953  Keast
3,442,441 A *   5/1969  Dettmering ............. F01D 5/142
                                                        415/181
(Continued)

FOREIGN PATENT DOCUMENTS

CH    344800        2/1960
DE    60037170      9/2008
(Continued)

OTHER PUBLICATIONS

European Search Report dated Aug. 7, 2015 for related European Appl. No. 15158652.6.
(Continued)

*Primary Examiner* — Woody Lee, Jr.
*Assistant Examiner* — Adam W Brown
(74) *Attorney, Agent, or Firm* — Shuttleworth & Ingersoll, PLC; Timothy J. Klima

(57) ABSTRACT

A blade row group arrangeable in a main flow path of a fluid-flow machine and including N adjacent member blade rows firmly arranged relative to one another both in the meridional direction and in the circumferential direction is provided. Here, a front member blade row with front blades having a leading edge and a trailing edge as well as a rear member blade row with rear blades having a leading edge and a trailing edge are provided, and the blade row group has two main flow path boundaries. It is provided that the profile of the blades of the member blade rows is firmly connected at at least one of the two main flow path boundaries to a base.

20 Claims, 14 Drawing Sheets

(51) Int. Cl.
*F01D 25/24* (2006.01)
*F04D 29/54* (2006.01)
*F04D 29/64* (2006.01)
*F01D 9/00* (2006.01)
*F01D 9/02* (2006.01)

(52) U.S. Cl.
CPC .............. *F01D 9/042* (2013.01); *F01D 25/24* (2013.01); *F01D 25/246* (2013.01); *F04D 29/542* (2013.01); *F04D 29/544* (2013.01); *F04D 29/64* (2013.01); *F04D 29/644* (2013.01); *F05D 2240/121* (2013.01); *F05D 2240/122* (2013.01); *Y02T 50/673* (2013.01)

(58) Field of Classification Search
CPC ........ F01D 5/146; F04D 29/544; F04D 29/64; F04D 29/644; F04D 29/542; Y02T 50/673; F05D 2240/121; F05D 2240/122
See application file for complete search history.

(56) References Cited

U.S. PATENT DOCUMENTS

| | | | | |
|---|---|---|---|---|
| 5,236,307 | A | * | 8/1993 | Ng ........................ F01D 5/146 415/148 |
| 5,398,496 | A | * | 3/1995 | Taylor .................... F01D 9/023 60/752 |
| 6,099,245 | A | | 8/2000 | Bunker |
| 6,312,219 | B1 | | 11/2001 | Wood et al. |
| 6,511,285 | B2 | | 1/2003 | Dodd |
| 7,445,426 | B1 | | 11/2008 | Matheny et al. |
| 8,534,997 | B2 | * | 9/2013 | Guemmer .............. F01D 5/146 415/181 |
| 8,573,941 | B2 | * | 11/2013 | Hoeger .................. F01D 5/142 415/181 |
| 9,303,513 | B2 | * | 4/2016 | Gomez .................... F01D 1/04 |
| 9,453,423 | B2 | * | 9/2016 | Gomez .................... F01D 9/00 |
| 9,470,091 | B2 | * | 10/2016 | Gomez .................... F01D 5/022 |
| 2008/0134685 | A1 | | 6/2008 | Bunker et al. |

FOREIGN PATENT DOCUMENTS

| | | | |
|---|---|---|---|
| DE | 102011084125 | | 4/2013 |
| EP | 1122407 | | 8/2001 |
| EP | 2218876 | | 8/2010 |
| EP | 2261463 | | 12/2010 |
| EP | 2474744 | | 7/2012 |
| EP | 2833001 | | 2/2015 |
| GB | 2235734 A | * | 3/1991 ............. F01D 5/066 |

OTHER PUBLICATIONS

German Search Report dated Dec. 2, 2014 from counterpart German App No. 10 2014 205 226.2.

* cited by examiner

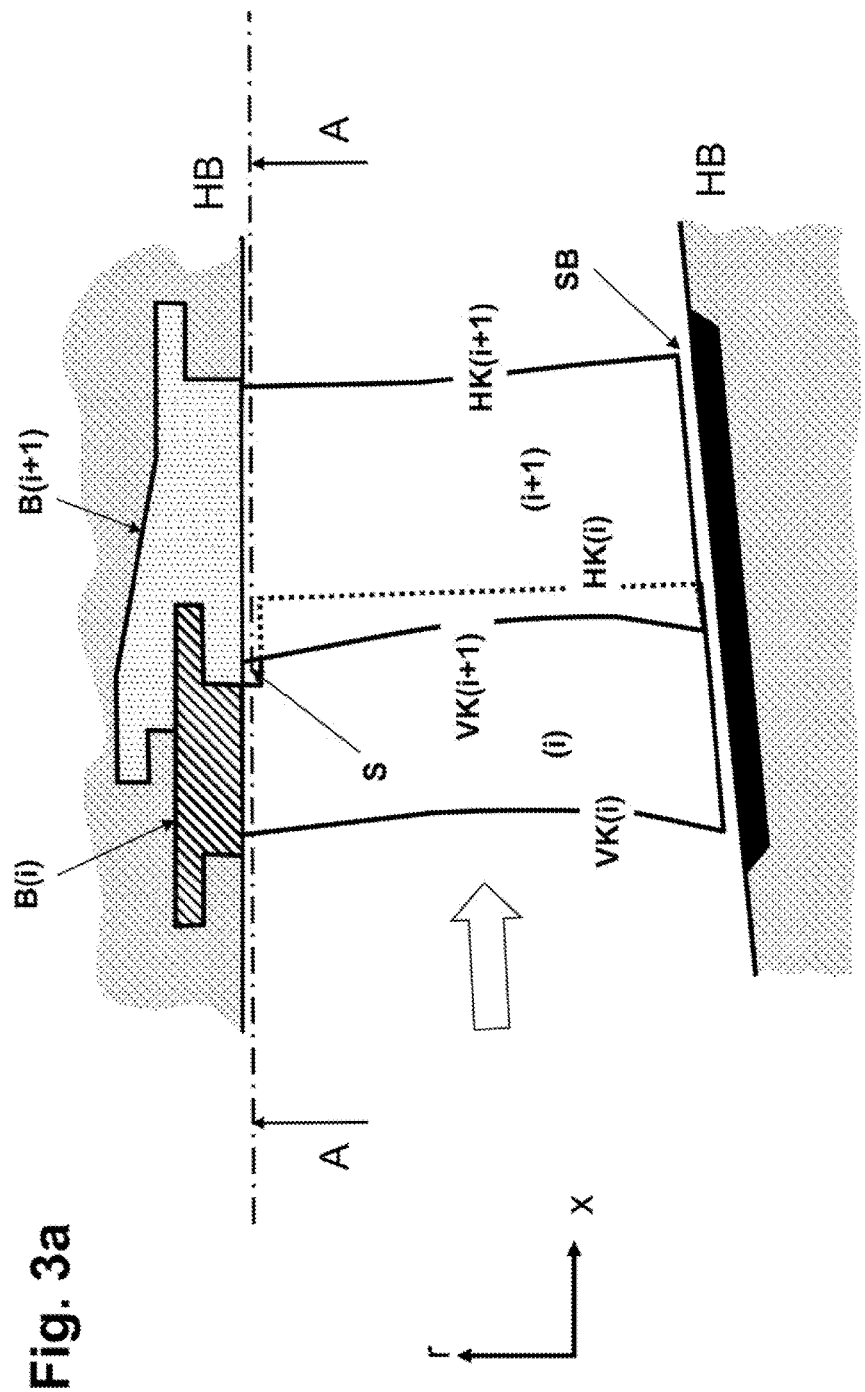

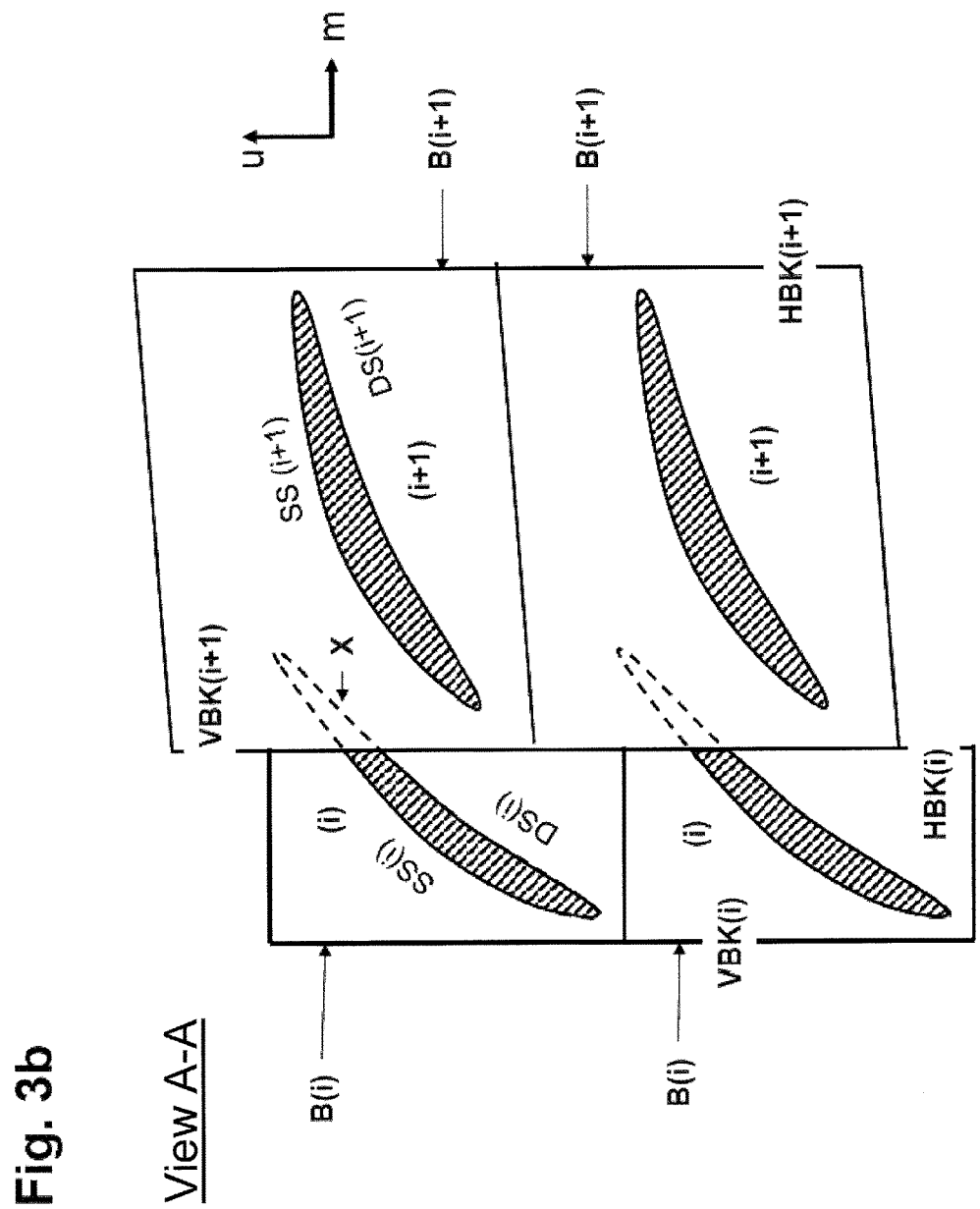

View A-A

View A-A

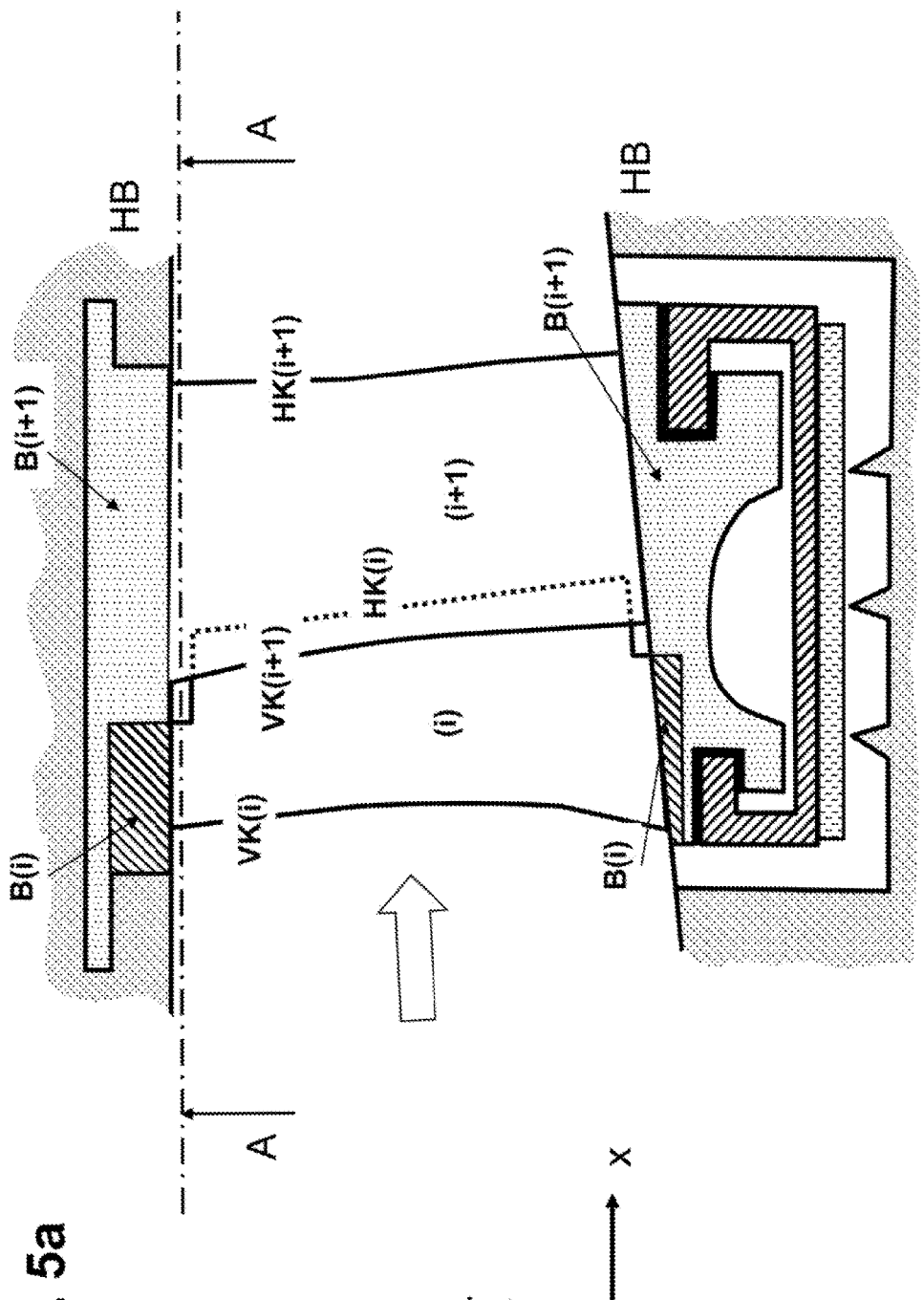

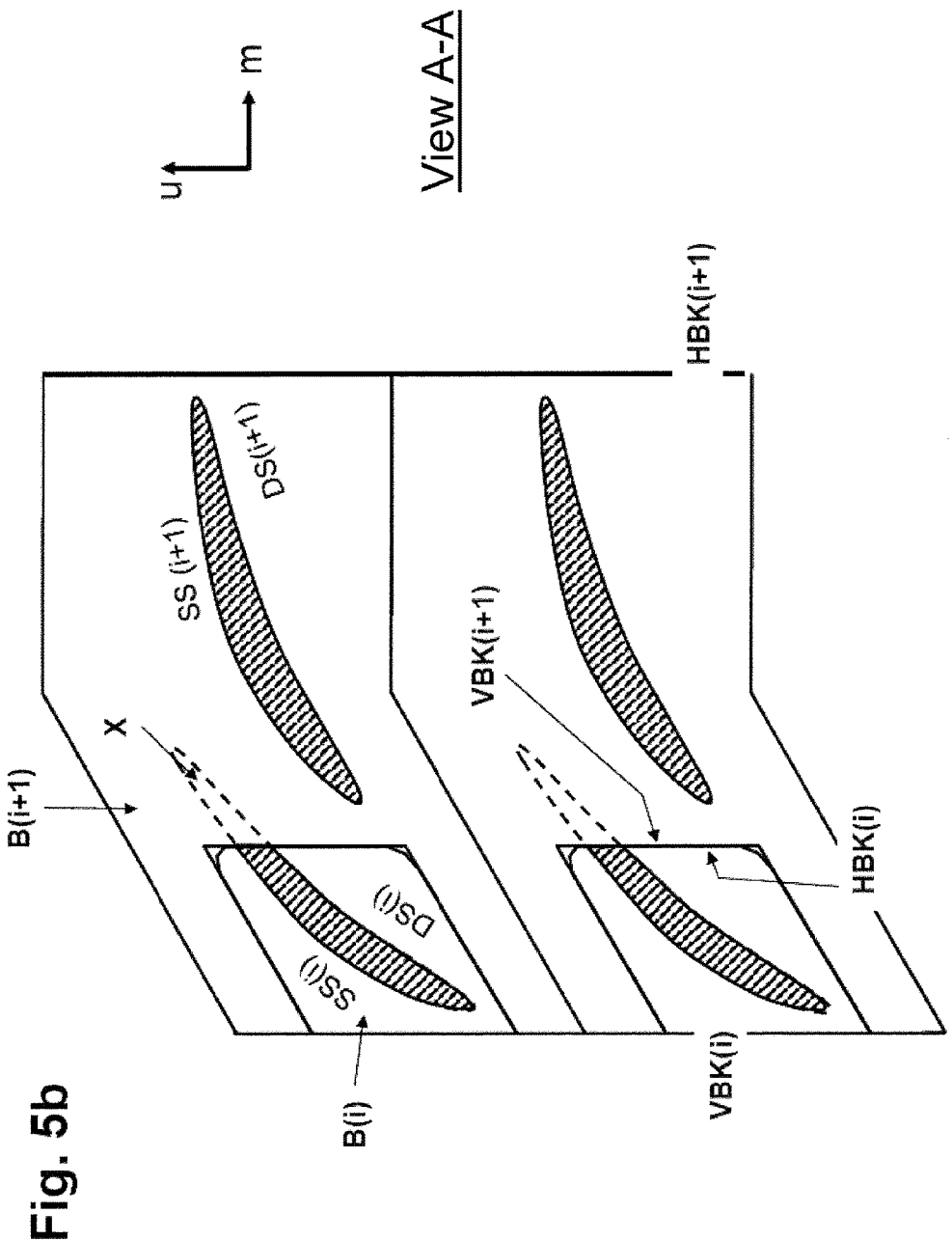

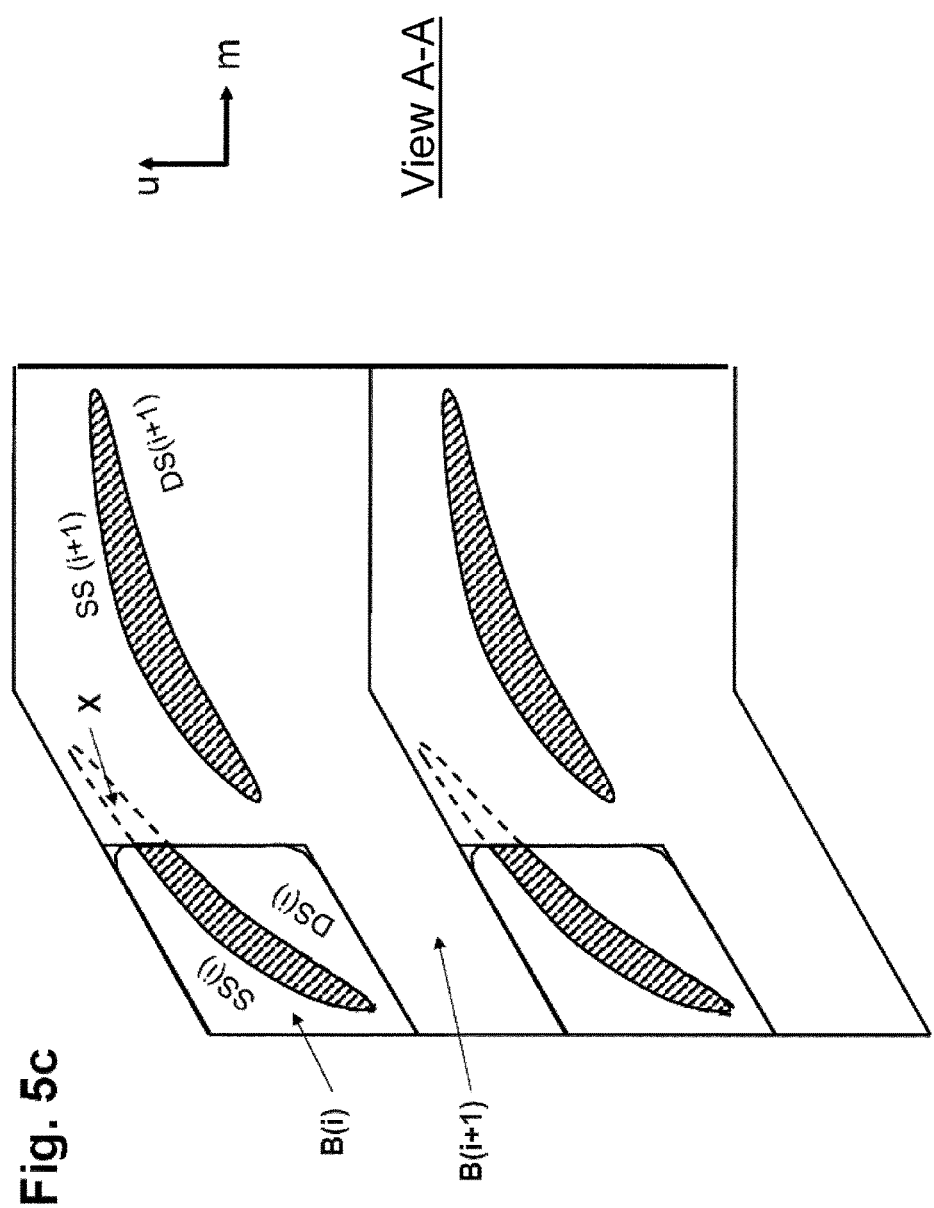

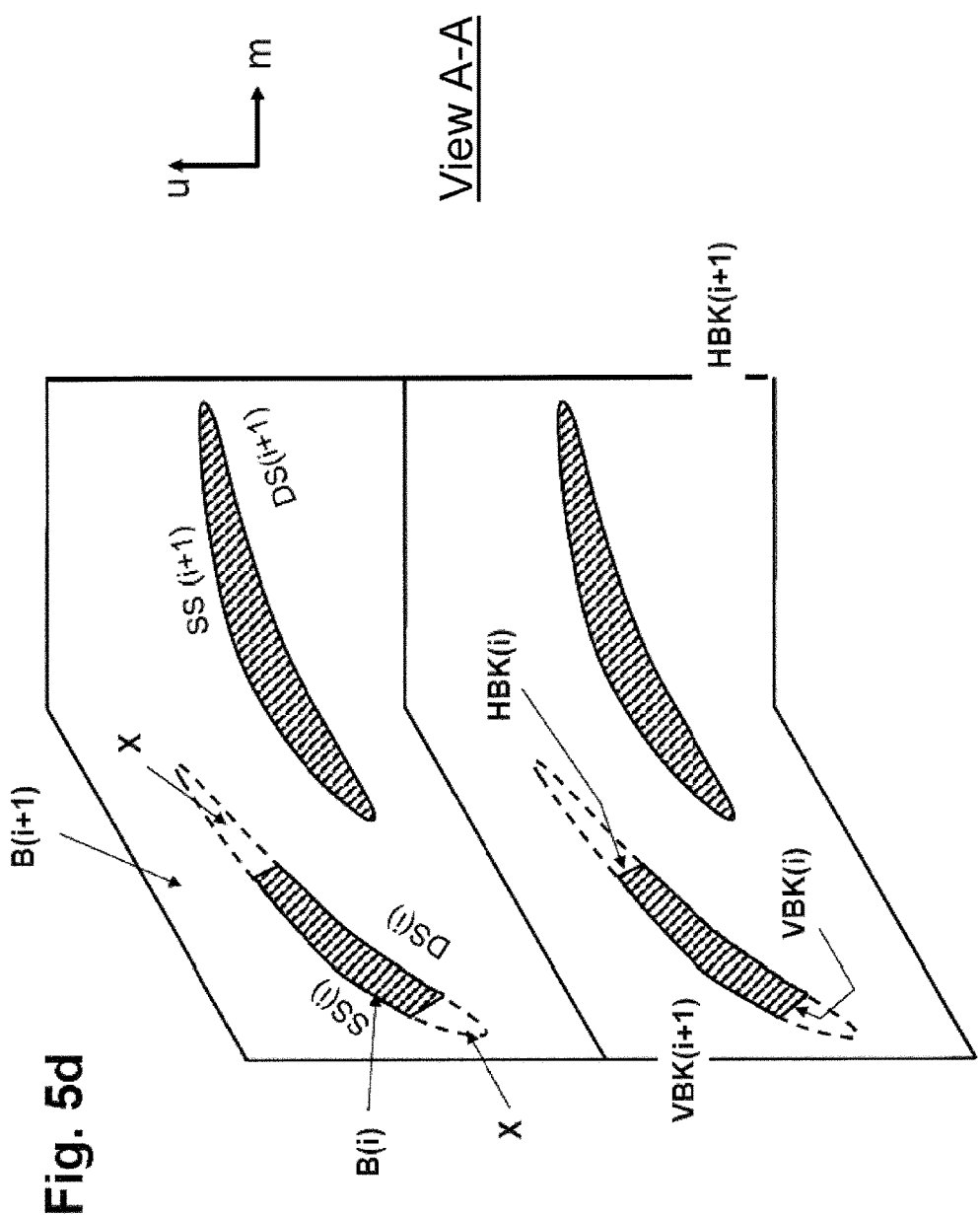

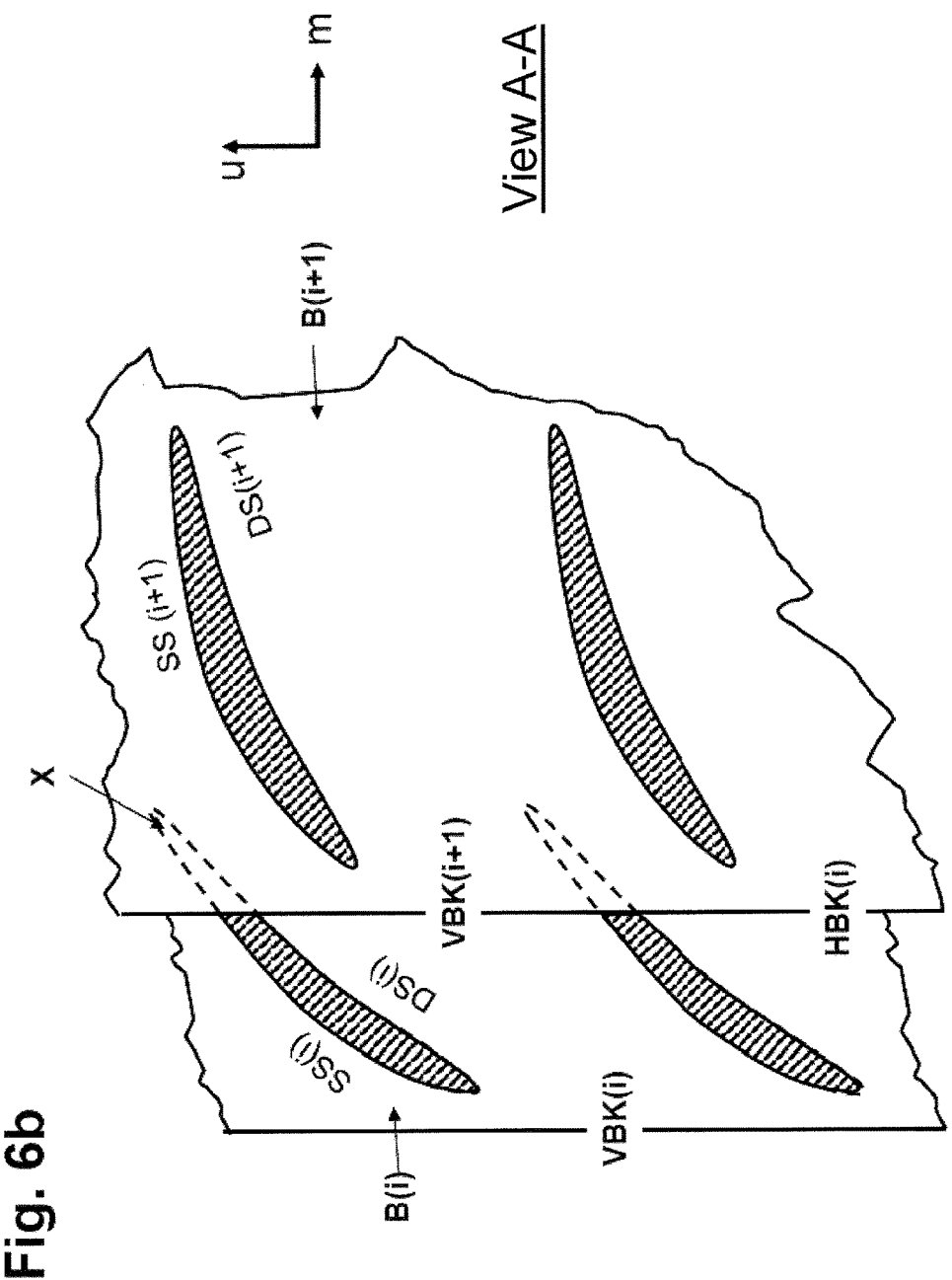

GROUP OF BLADE ROWS

CROSS-REFERENCE TO RELATED APPLICATION

This application claims priority to German Patent Application No. 10 2014 205 226.2 filed on Mar. 20, 2014, the entirety of which is incorporated by reference herein.

BACKGROUND

This invention relates to a blade row group. In particular, the invention relates to a stator vane row group.

The aerodynamic loadability and the efficiency of fluid-flow machines, in particular blowers, compressors, turbines, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid-flow machines are arrangements with double-row stator wheels, usually employed as outlet guide vane assemblies in compressors, or also double-row rotor arrangements in which directly adjacent rotors operate counter-rotatingly, or in which two directly adjacent rotor blade rows are attached to a common drum. A fluid-flow machine of this type is known for example from EP 2 261 463 A2. With these arrangements, and in particular with those having several, directly adjacent blade rows firmly arranged relative to one another (for example several rotor blade rows on the same drum, or several stator vane rows), severe boundary layer separation occurs at higher aerodynamic loading in the boundary zone of the main flow path, i.e. at the hub or casing contour.

The state of the art also includes double-row adjustable stator wheels, the vanes of which at the hub and at the casing are arranged on a rotary base to allow them to be turned in the angle of attack.

In any event, the problem arises in blade group arrangements, on account of the intended axially narrow spacing between the member blade rows, that the fixing of the involved blades to the hub and inside the casing is difficult to implement in terms of design, so that new solutions are required to achieve a compact design of the machine. This applies in particular to stator vane row groups.

SUMMARY

An object underlying the present invention is to provide a blade row group that enables the fixing of the blades of the blade row group to at least one of the main flow path boundaries to be achieved by a compact design.

It is a particular object of the present invention to provide solution to the above problems by a blade row group having the features as described herein.

Accordingly, the solution in accordance with the invention provides a blade row group that is arrangeable in a main flow path of a fluid-flow machine and includes N adjacent member blade rows firmly arranged relative to one another in both the meridional direction and the circumferential direction. Here, a front member blade row with front blades having a leading edge and a trailing edge as well as a rear member blade row with rear blades having a leading edge and a trailing edge are provided, and the blade row group has two main flow path boundaries.

It is provided in accordance with the invention that the profile of the blades of the member blade rows is firmly connected at at least one of the two main flow path boundaries to a base, where at least one blade profile of a blade of one of the two member blade rows extends beyond its base, at least where it adjoins the main flow path boundary, and also protrudes onto the base of at least one blade of the other of the two member blade rows.

It is thus provided that a blade profile is firmly arranged on a base. Here, the base can be formed by a single blade root, a ring segment extending over several blades (vanes) in a stator vane row or a complete ring extending over all blades (vanes) in a stator vane row. The bases of two adjacent member blade rows directly adjoin one another over at least part of the circumference of the fluid-flow machine, where at least one blade profile of one of the two rows extends beyond its base and protrudes onto the base of at least one blade profile of the other of the two rows. A gap with finite or zero width can be provided here between the extending part of the blade profile of the one row and the base of the other row. In the latter case, the situation is such that in the blade profile area extending beyond its base there is a radial gap between the blade profile and the base of at least one blade of the other member blade row.

The solution in accordance with the present invention provides for a structurally compact design for fixing the blades of a blade row group. In particular, small axial clearances between blades of adjacent blade rows in a blade row group can be achieved here. It can also be provided that from the leading edge of a blade of a rear member blade row to the trailing edge of a blade of a front member blade row, there is a meridional meshing, i.e. an overlap of the blades in the meridional direction. However, this is not necessarily the case.

Further embodiments can be provided as follows:

According to an embodiment, the base of at least one blade of one of the member blade rows has, at least at one of its two lateral contact edges to adjacent blades of the same blade row, an angled course formed by at least two straights. It can be provided here that the lateral contact edges are each formed by two straights, i.e. one running in the axial direction and one running obliquely to the axial direction.

A further embodiment of the invention provides that the bases of the member blade rows, in the plane established by the meridional coordinate m and the circumferential coordinate u, each have an extent greater than the extension of the blade profile of the blades. According to this embodiment, it is not the case that the base is formed substantially only by an extension of the blade profile beyond the main flow path boundary.

A further embodiment of the invention provides that in a view perpendicular to the gas path-side surface of the main flow path boundary, the base of a blade of the one row is at least partially embedded into the base of a blade of the other row. For this purpose, it can be provided that a front base edge of the front base and at least one section of a front base edge of the rear base or a rear base edge of the rear base and at least one section of the rear base edge of the front base form a common line. Furthermore it can be provided here that a lateral contact edge of a base of the one row adjoins the lateral contact edge of the base of an adjacent blade of the other row.

In a design variant, the base of a blade of the one row is completely embedded into the base of a blade of the other row. It can also be provided that the base of a blade of the one row is provided in the area of lateral contact edges—extending obliquely to the axial direction—of the base of a blade of the other row.

In a blade row group in accordance with the present invention it can be provided that at both member blade rows on the outer main flow path boundary formed by a casing a fixed blade end of the blades is provided, while at least at one of the two member blade rows on the inner main flow path boundary formed by a hub a free blade end with running gap is provided.

Alternatively, it can be provided in a blade row group in accordance with the present invention that at both member blade rows on the outer main flow path boundary formed by a casing a fixed blade end of the blades is provided, where at least at one of the two member blade rows on the inner main flow path boundary formed by a hub also a fixed blade end, e.g. in an arrangement with an internal shroud, is provided.

The present invention relates to blades of fluid-flow machines, such as blowers, compressors, pumps, fans and turbines of the axial, semi-axial and radial type using gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating from stage to stage. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

FIG. 3a shows a stator vane group in accordance with the present invention.

FIG. 3b shows an arrangement of two member blade rows in accordance with the present invention (circumferential view in section A-A from FIG. 3a).

FIG. 5a shows a further stator vane group in accordance with the present invention.

FIG. 5b shows an arrangement of two member blade rows in accordance with the present invention (circumferential view in section A-A from FIG. 5a).

FIG. 5c shows an arrangement of two member blade rows in accordance with the present invention (circumferential view in section A-A from FIG. 5a).

FIG. 5d shows a further arrangement of two member blade rows in accordance with the present invention (circumferential view in section A-A from FIG. 5a).

FIG. 6b shows an arrangement of two member blade rows in accordance with the present invention (circumferential view in section A-A from FIG. 6a).

DETAILED DESCRIPTION

Figure 1:
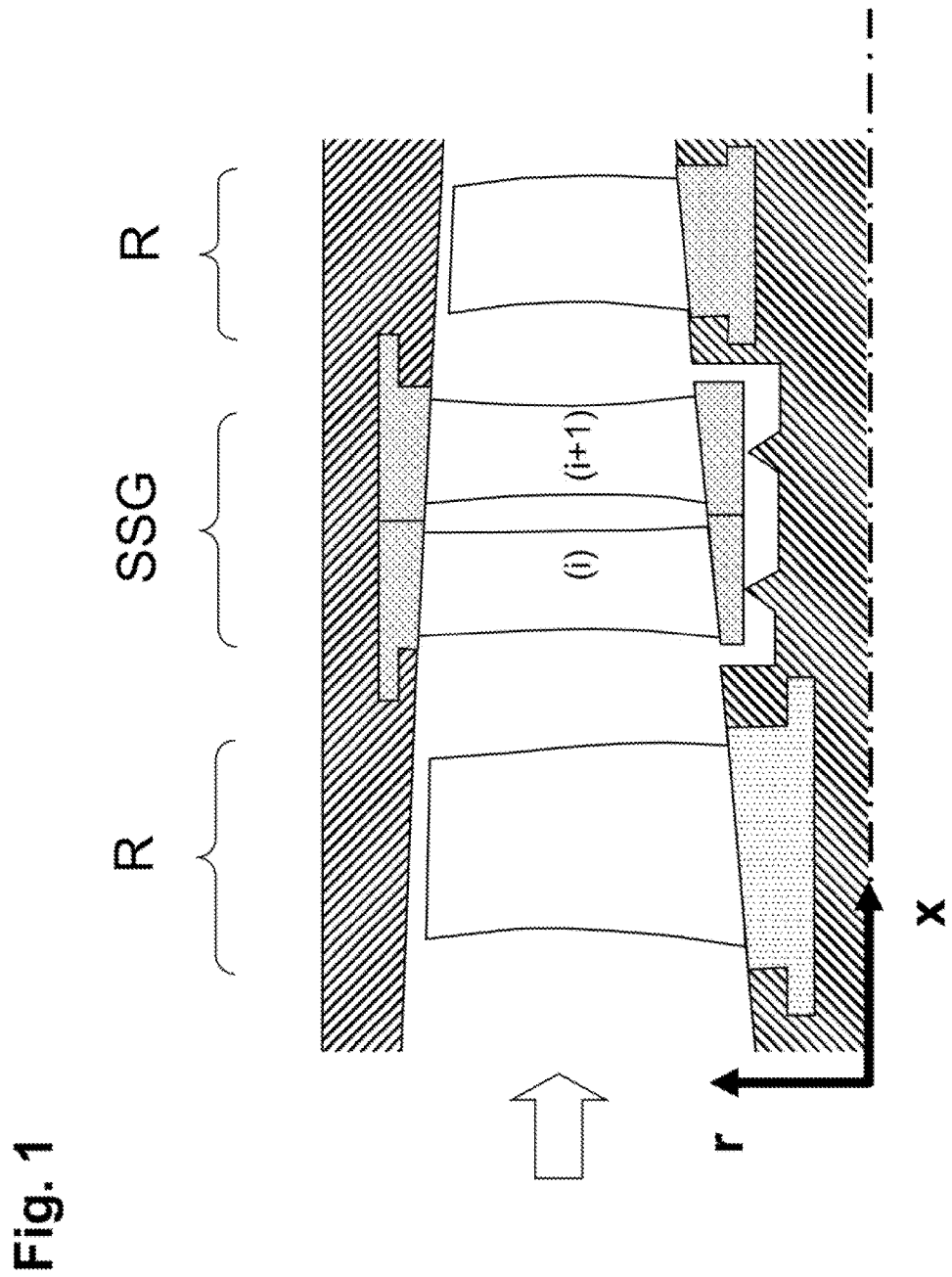
FIG. 1 shows a stator vane row group in accordance with the state of the art.

FIG. 1 shows, in the meridional plane established by the axial direction x and the radial direction r, the section of a fluid-flow machine with two rotor blade rows and a stator vane row group SSG arranged between them, said stator vane row group including at least two similar directly adjacent member vane rows not changing their relative arrangement to one another (both in the circumferential direction and in the meridional direction), with the first member of the group being marked (i) and the second member of the group being marked (i+1).

It is pointed out that for purposes of a clearer illustration in FIG. 1 and also in the other figures, no distinction is made between the identification of the member blade rows (i) and (i+1) and the identification of the individual members or blades of the member blade rows, i.e. the members or blades of the blade rows too are identified with (i) and (i+1).

The blade profile represents the aerodynamically relevant part of the blade around which gas flows (unlike a blade root, for example). For purposes of a clearer illustration in the figures, no distinction is made between the identification of the blade profile and the identification of the respective blade.

Figure 2:
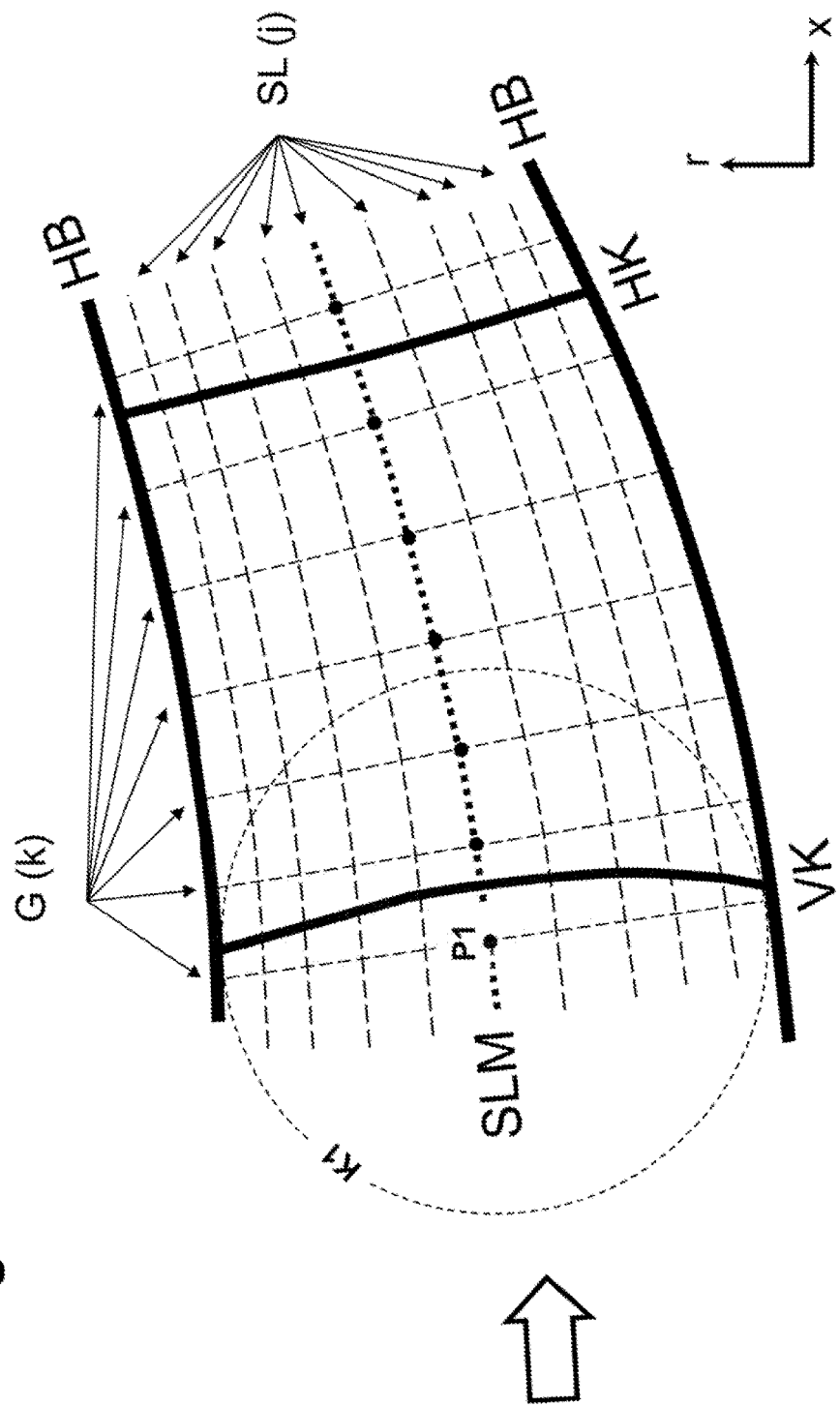
FIG. 2 shows the definition of meridional flow lines.

FIG. 2 shows, for the definition of meridional flow lines, a main flow path of a fluid-flow machine with through-flow from left to right (indicated by the bold arrow), in the meridional plane established by the axial coordinate x and the radial coordinate r, where the main flow path is delimited by the radially inner main flow path boundary HB and by the radially outer main flow path boundary HB. The mean meridional flow line SLM is in the center between the radially inner main flow path boundary HB and the radially outer main flow path boundary HB. Its course matches the connection of the center points of circles inscribed in the main flow path, as is made clear by the example in the illustration for the first marked point P1 on the mean meridional flow line SLM and the appertaining circle K1. VK and HK indicate the leading edge and the trailing edge of a blade arranged in the main flow path.

There is a family of straight lines G(k) inside the main flow path whose members are each perpendicular to the mean meridional flow line SLM and end at the main flow path boundaries HB. Further meridional flow lines SL(j) are defined by the connection of points with an identical percentage subdivision of the straight lines G(k) between the main flow path boundaries HB in each case. The rotation of a meridional flow line about the machine axis results in a meridional flow surface SF(j). The intersection of a meridional flow surface with a blade of the fluid-flow machine results in a meridional flow line section SLS(j).

FIG. 3a shows, in the meridional plane established by the axial direction x and the radial direction r, a stator vane row group SSG in accordance with the present invention, including two directly adjacent stationary stator vane rows (i) and (i+1). A configuration of more than two member blade rows, e.g. three member blade rows, is also in accordance with the invention. The two member blade rows shown can, in accordance with the invention, also be formed in the same way by two member blade rows from a combination of three or more member blade rows.

The two blade row members (i) and (i+1) shown have a firm connection between the radially outer blade end and the radially outer main flow path boundary HB (fixed blade end) on the casing as well as a fastening of the blades inside the casing, and they have a radial gap SB between the radially inner blade end and the radially inner main flow path boundary HB (free blade end) at the hub.

The leading and trailing edges of the blades of row (i) are identified with VK(i) and HK(i), while the leading and trailing edges of the blades of row (i+1) are identified with VK(i+1) and HK(i+1).

At the fixed blade end of the rows (i) and (i+1), the blade profile is fastened on a base B(i), B(i+1) respectively. It can be advantageous when the base B(i), B(i+1) of at least one of the two rows (i) and (i+1) is formed by a single blade root. It can be provided here that a blade root of row (1) is formed substantially only by an extension of at least part of the blade profile beyond the main flow path boundary, where the bases of the rows (i) and (i+1) are connected to one another by a press-fit type of joint, if required.

Alternatively, it can be provided that the base of at least one of the two rows (i) and (i+1) is formed by a ring segment extending over several blades (vanes) in a stator vane row.

Alternatively, it can furthermore be provided that the base of at least one of the two rows (i) and (i+1) is formed by a complete ring extending over all blades (vanes) in a stator vane row.

For a detailed view of the geometry in accordance with the invention, FIG. 3a shows a section A-A, by means of which the blade arrangement is described more precisely in the following. The section A-A extends along a meridional flow line at an infinitesimally small distance from the main flow path boundary HB, so that it passes, over its full extent, through a gap provided along the main flow path boundary HB.

FIG. 3b shows the stator vane row arrangement in accordance with the present invention in section A-A from FIG. 3a, hence in a plane established by the meridional coordinate m and the circumferential coordinate u. The respective base B(i), B(i+1) of the blades (vanes) is formed in the representation selected here by individual blade (vane) roots. The base B(i) of the blades of row (i) has a front base edge VBK(i) and a rear base edge HBK(i). The base B(i+1) of the blades of row (i+1) has a front base edge VBK(i+1) and a rear base edge HBK(i+1). The substantially convex suction sides of the blades of the rows (i) and (i+1) are marked SS and the substantially concave pressure sides are marked DS.

In accordance with the invention the bases B(i), B(i+1) of two adjacent member blade rows (i) and (i+1) directly adjoin one another such that the rear base edge HBK(i) adjoins the front base edge VBK(i+1) in the embodiment in accordance with the present invention here shown along the entire circumference of the fluid-flow machine with a constant axial position.

It can be favourable here when the base B(i), B(i+1) of at least one of the two member blade rows (i) and (i+1) has a parallelogram-like or even a rectangular shape. In a particularly advantageous design, the bases B(i), B(i+1) of both member blade rows (i) and (i+1) have a rectangular shape.

Not shown here, but also in accordance with the invention, are arrangements in which the rear base edge HBK(i) and the front base edge VBK(i+1) extend along at least part of the circumference with a variable axial position. It is favourable here when at least one of the base edges VBK(i) and HBK(i+1) runs in the circumferential direction with a constant axial position, such that the bases of the member blade rows (i) and (i+1) assume a defined and invariable position relative to one another in the circumferential direction. It can be favourable here to design the course of at least one of the base edges HBK(i) and VBK(i+1) as a polygonal line or if necessary as a straight.

In the arrangement of FIGS. 3a, 3b it is provided that at least one blade profile of the front row (i) extends beyond its base in the flow direction and protrudes onto the base of at least one blade profile of the rear row (i+1) in the flow direction. Consequently, the blade profile of row (i) is arranged projecting in the area of its trailing edge HK(i), with a gap being provided in the area X projecting beyond its base B(i) between the blade profile and the base B(i+1) of the blades of the rear row (i+1). The gap is identified with S in FIG. 3a.

In the case shown here, the leading edge VK(i+1) of a blade of row (i+1) is arranged close to the front base edge VBK(i+1) such that at least in the area of the outer main flow path boundary HB the trailing edge HK(i) extends downstream of the leading edge VK(i+1), i.e. a meridional meshing of each two adjacent blades (i), (i+1) is provided at least in an area adjoining the main flow path boundary HB.

As already mentioned, it can be provided that there is a gap S between the projecting part X of the blade profile of row (i) and the base B(i+1) of row (i+1). It can be provided here for selected arrangements that the projecting part X of the blade profile of row (i) is in close contact with the base B(i+1) of row (i+1), so that the gap S has a width of equal to or close to zero.

It can also be provided that the base B(i+1) of one of the blades of row (i+1) has, at least at one of the two lateral contact edges to adjacent blades of row (i+1), an angled course formed by at least two straights. It can be particularly favourable here when at least one of the lateral contact edges is formed by two straights, one running in the axial direction and one running obliquely to the axial direction.

Figure 3C:
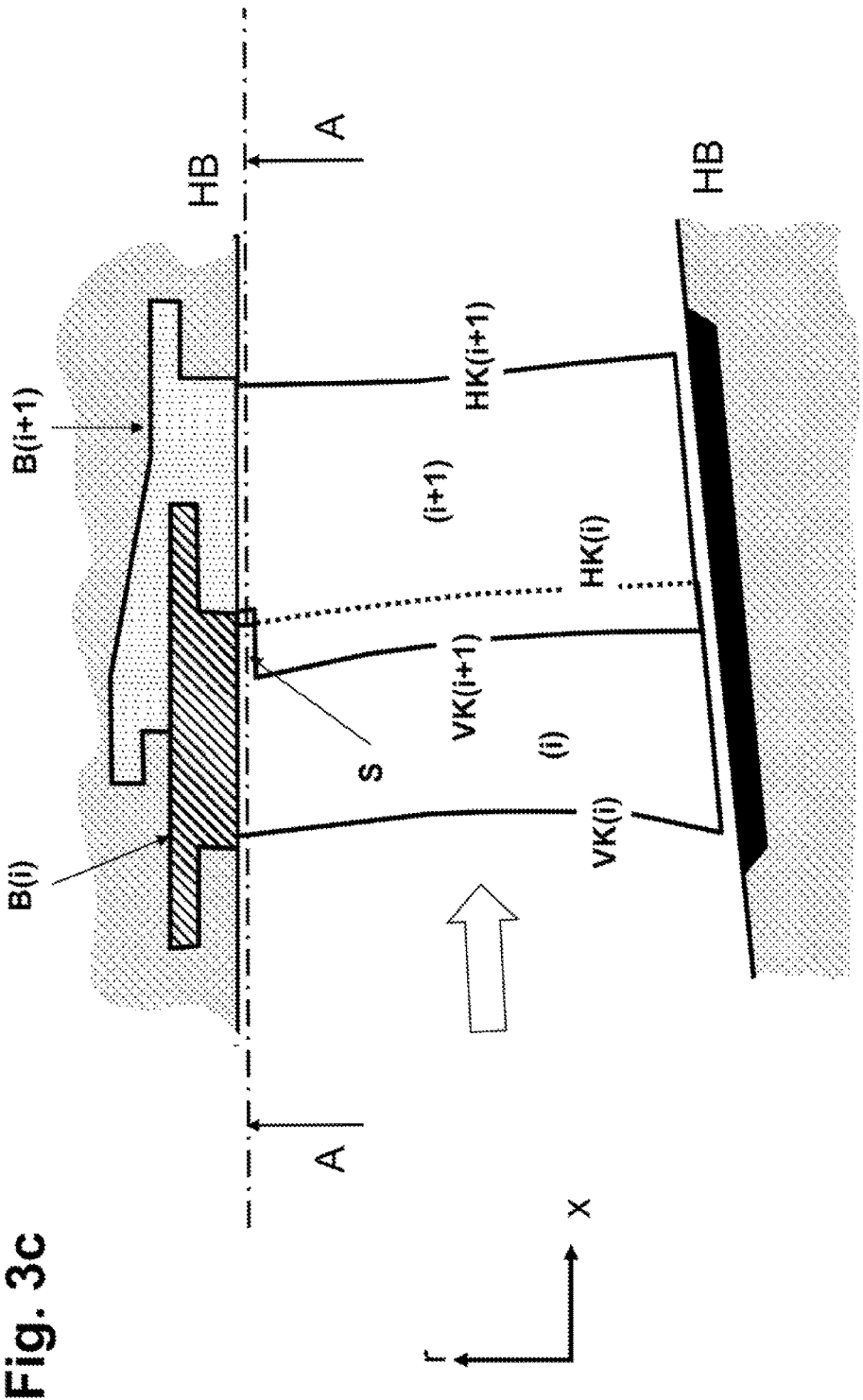
FIG. 3c shows a further stator vane group in accordance with the present invention.

FIG. 3c shows, similarly to FIG. 3a, in the meridional plane established by the axial direction x and the radial direction r, a stator vane row group SSG in accordance with the present invention including two directly adjacent stationary stator vane rows (i) and (i+1).

In the arrangement shown here, at least one blade profile of the rear row (i+1) extends beyond its base B(i+1) against the flow direction and protrudes onto the base B(i) of at least one blade profile of the front row (i) against the flow direction. Consequently, the blade profile of row (i+1) is arranged projecting in the area of its leading edge VK(i+1).

In the area projecting beyond its base B(i+1), there is a gap S between the blade profile and the base B(i) of the blades of the front row (i+1).

Figure 3D:
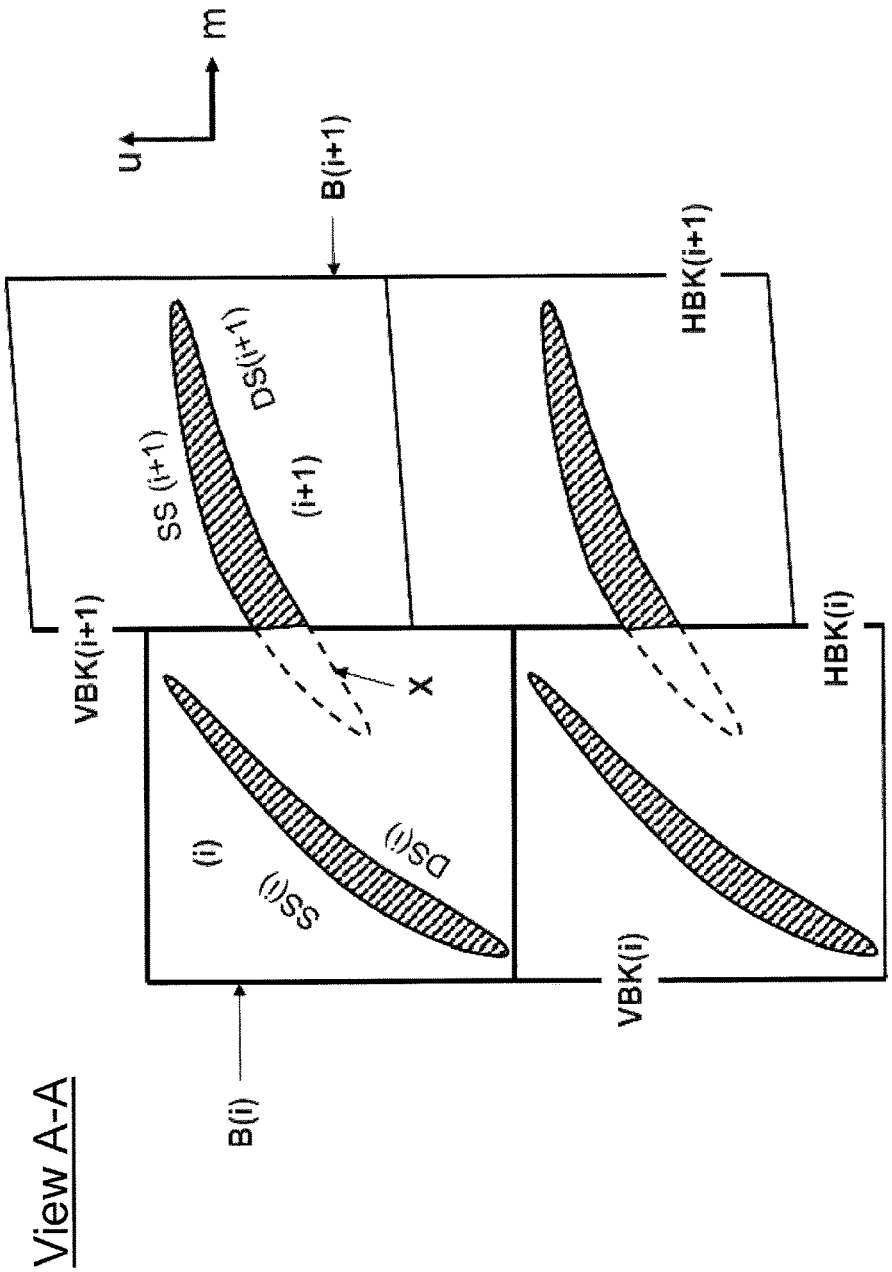
FIG. 3d shows an arrangement of two member blade rows in accordance with the present invention (circumferential view in section A-A from FIG. 3c).

FIG. 3d shows the stator vane row arrangement in accordance with the present invention in section A-A from FIG. 3c, hence in a plane established by the meridional coordinate m and the circumferential coordinate u. The base B(i), B(i+1) of the blades i, i+1 is formed here too by individual blade roots.

In the case shown here, the trailing edge HK(i) of a blade of row (i) is provided close to the rear base edge HBK(i) such that at least in the area of the outer main flow path boundary HB the trailing edge HK(i) extends downstream of the leading edge VK(i+1), i.e. a meridional meshing of each two adjacent blades (i), (i+1) is provided at least in an area adjoining the main flow path boundary HB.

As already mentioned, it can be provided that there is a gap between the projecting part X of the blade profile of row (i+1) and the base B(i) of the front row (i). It can be provided here for selected arrangements that the projecting part X of the blade profile of row (i+1) is in close contact with the base B(i) of row (i), so that the gap has a width of equal to or close to zero.

Figure 4A:
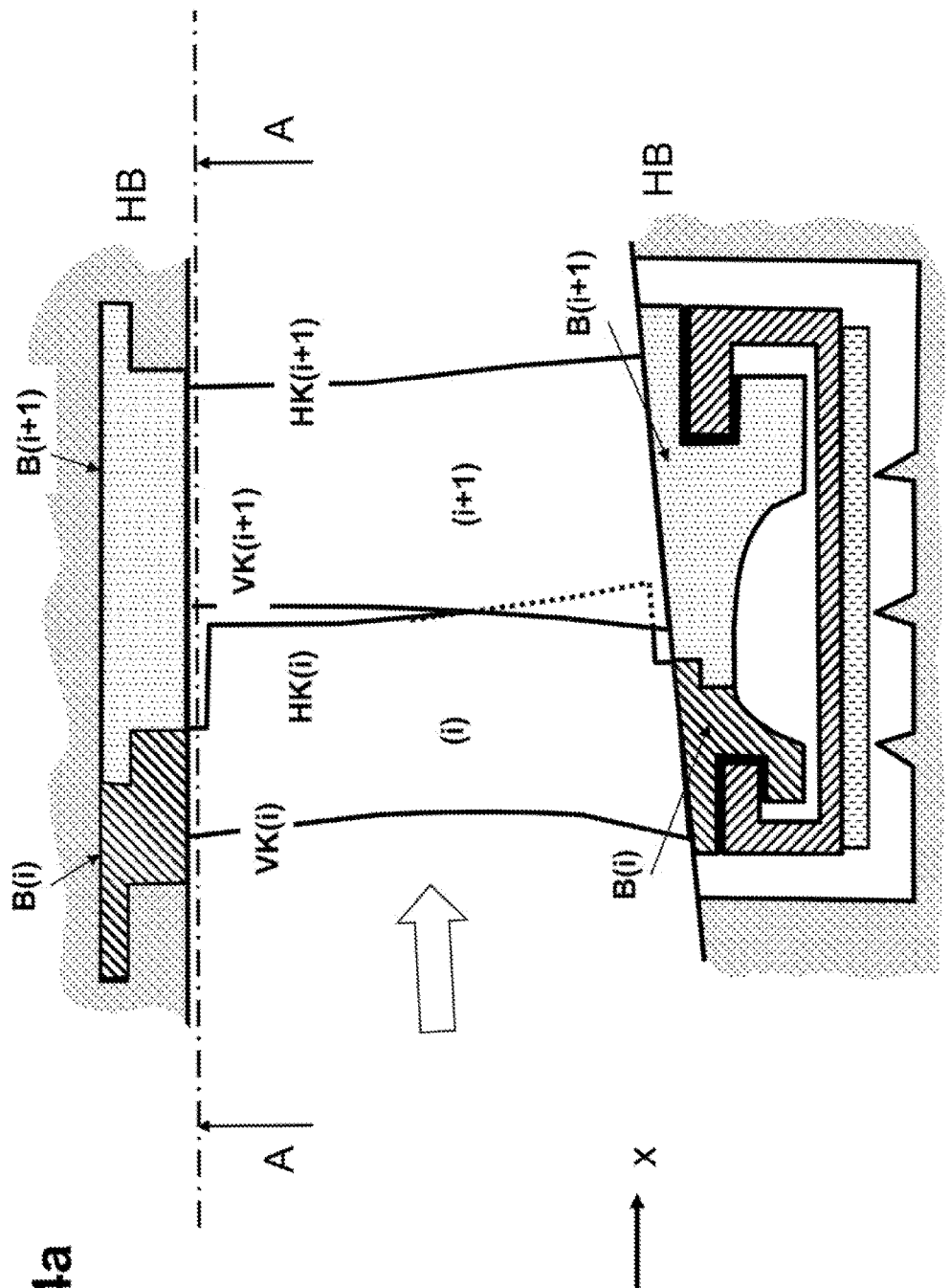
FIG. 4a shows a further stator vane group in accordance with the present invention.

FIG. 4a shows, in the meridional plane established by the axial direction x and the radial direction r, a stator vane row group SSG in accordance with the present invention including two directly adjacent stationary stator vane rows (i) and (i+1). The two blade row members (i) and (i+1) shown have a firm connection between the radially outer blade end and the outer main flow path boundary HB on the casing as well as a fastening of the blades inside the casing. The blade row members also have a firm connection between the inner blade end and the inner main flow path boundary, provided by a shroud structure embedded into a cavity in the hub, as well as a fastening of the blades inside the shroud structure.

At each two blade ends of the blades of rows (i) and (i+1), the blade profile is fastened on a base B(i), B(i+1), said base here being formed by individual blade roots. It is the case at both blade ends that a blade profile of the front row (i) extends beyond its base B(i) and protrudes onto the base B(i+1) of at least one blade profile of the rear row (i+1) in the flow direction.

Figure 4B:
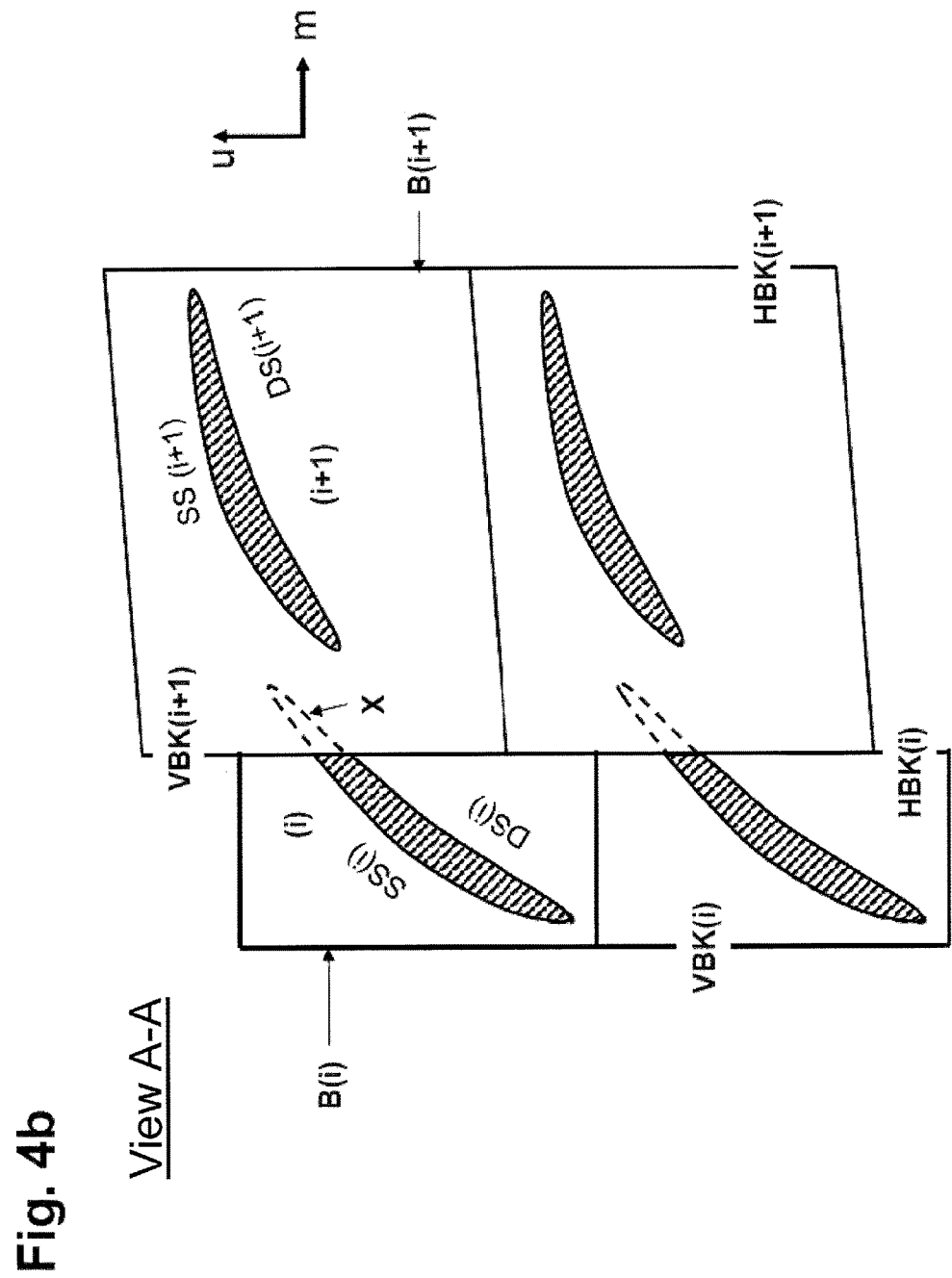
FIG. 4b shows an arrangement of two member blade rows in accordance with the present invention (circumferential view in section A-A from FIG. 4a).

FIG. 4b shows the stator vane row arrangement in accordance with the invention in the section A-A from FIG. 4a at an infinitesimally small distance from the main flow path boundary, hence in a plane established by the meridional coordinate m and the circumferential coordinate u.

In the case shown here, the leading edge VK(i+1) of a blade of row (i) is provided at a distance from the front base edge VBK(i+1) such that at least in the area of the outer main flow path boundary the trailing edge HK(i) is provided upstream of the leading edge VK(i+1).

FIG. 5a shows, similarly to FIG. 4a, a stator vane row group SSG in accordance with the present invention in the meridional plane established by the axial direction x and the radial direction r. In accordance with the invention, the base B(i) of the blades of row (i) is, when looking onto the gas path-side surface of the main flow path boundary, at least partially surrounded by the base B(i+1) of the blades of row (i+1) in this exemplary embodiment. It can be provided here that the base B(i) of the blades of row (i) is completely recessed into the base B(i+1) of the blades of row (i+1) relative to the axial direction.

As in FIG. 4a, the blade row members also have a fixed connection between the inner blade end and the inner main flow path boundary, provided by a shroud structure embedded into a cavity in the hub, as well as a fastening of the blades inside the shroud structure.

At each two blade ends of the blades of rows (i) and (i+1), the blade profile is fastened on a base B(i), B(i+1), said base here being formed by individual blade roots. It is the case at both blade ends that a blade profile of the front row (i) extends beyond its base B(i) and protrudes onto the base B(i+1) of at least one blade profile of the rear row (i+1) in the flow direction.

FIG. 5b shows the stator vane row arrangement in accordance with the invention in the section A-A from FIG. 5a at an infinitesimally small distance from the main flow path boundary, hence in a plane established by the meridional coordinate m and the circumferential coordinate u. It is provided that at least in the area of the outer main flow path boundary HB the trailing edge HK(i) is arranged downstream of the leading edge VK(i+1).

The base B(i) of the blades of row (i) is here surrounded on three sides by the base B(i+1) of the blades of row (i+1). The rear base edge HBK(i) and the front base edge VBK (i+1) adjoin one another along part of the circumference.

The base B(i+1) of row (i+1) can have here a rectangular, a parallelogram-like, a hexagonal and an angled shape, but it can be particularly advantageous when, as shown here, both lateral contact edges of the base of row (i+1) are each formed by two straights, one running in the axial direction and one running obliquely to the axial direction.

FIG. 5c shows an arrangement in section A-A similar to that in FIG. 5b. The base B(i) of row (i) is recessed into the base B(i+1) of row (i+1), such that one of the lateral contact edges of base B(i) of row (i) adjoins one of the lateral contact edges of base B(i+1) of row (i+1). It can be particularly favourable when this is provided in that area of a section of the lateral contact edge of the base of row (i+1) that runs obliquely to the axial direction.

FIG. 5d shows a variation in accordance with the invention of the base B(i) of row (i) designed as a blade root. Here, the blade root B(i) of row (i) is substantially formed only by an extension of at least one part of the blade profile beyond the main flow path boundary, where it can be favourable to connect the bases B(i) and B(i+1) of the rows (i) and (i+1) to one another by a press-fit type of joint. In this embodiment therefore, an extension of the blade profile, which in this case forms the blade root B(i), is recessed into the rear blade root B(i+1).

Figure 6A:
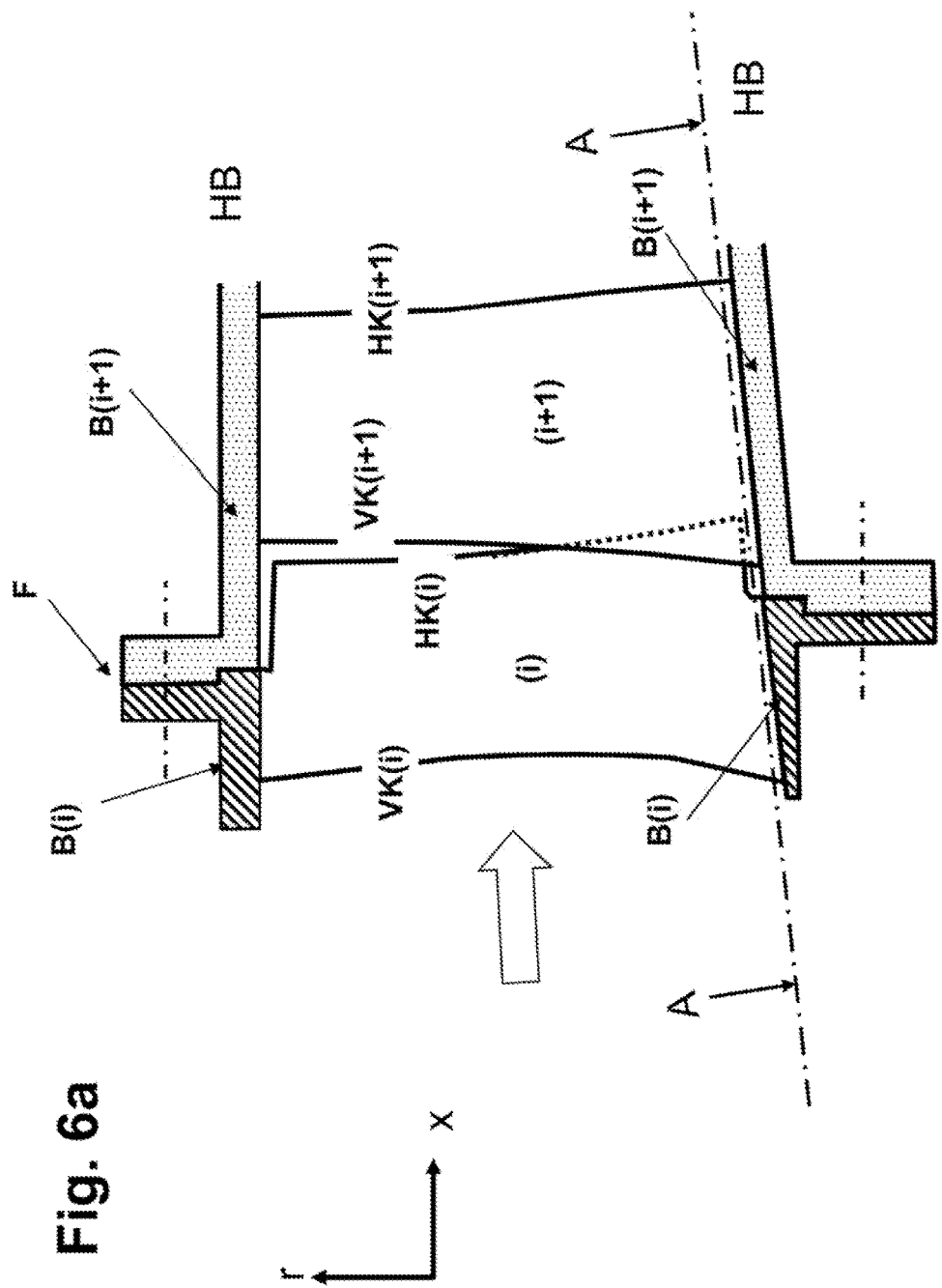
FIG. 6a shows a further stator vane group in accordance with the present invention.

FIG. 6a shows, similarly to FIGS. 3a, 4a and 5a, a stator vane row group SSG in accordance with the present invention in the meridional plane established by the axial direction x and the radial direction r. In accordance with the present invention at at least one fixed blade end of at least one of the rows (i) and (i+1), the base B(i) and B(i+1) is formed by a ring segment extending over several blades (vanes) in a stator vane row or by a complete ring extending over all blades (vanes) in a stator vane row. It can be provided here that the partial or complete ring is a structurally supporting component of the casing or hub. The two bases B(i) and B(i+1) are here connected to each other for example using a flange connection F.

In the embodiment of FIG. 6a too, it is the case that at at least one of the blade ends a blade profile of the front row (i) extends beyond its base B(i) and protrudes onto the base B(i+1) of at least one blade profile of the rear row (i+1) in the flow direction. Alternatively, it can also be provided that at at least one of the blade ends a blade profile of the rear row (i+1) extends beyond its base B(i+1) and protrudes onto the base B(i) of at least one blade profile of the front row (i) against the flow direction.

FIG. 6b shows the stator vane row arrangement in accordance with the invention in the section A-A from FIG. 6a at an infinitesimally small distance from the main flow path boundary, hence in a plane established by the meridional coordinate m and the circumferential coordinate u.

The rear base edge HBK(i) of the base B(i) and the front base edge VBK(i+1) of the base B(i+1) adjoin one another at the fixed blade end under consideration of the rows (i) and (i+1) along the entire circumference. It can be advantageous here when the rear base edge HBK(i) and the front base edge VBK(i+1) vary with regard to their axial position in the circumferential direction.

The present invention, in its design, is not limited to the exemplary embodiments shown. For instance, the principles of the present invention can be applied analogously to rotor blade rows and to the fixation of blade ends of rotor blades.

What is claimed is:

1. A blade row group arrangeable in a main flow path of a fluid-flow machine, comprising:
 a quantity N of adjacent member blade rows firmly arranged relative to one another in both a meridional direction (m) and a circumferential direction (u), with the quantity N of the member blade rows being greater than or equal to 2 and (i) designating an index notation with values between 1 and N,
 the quantity N of adjacent member blade rows including a front member blade row with front blades (i) each having a leading edge VK(i) and a trailing edge HK(i) as well as a rear member blade row with rear blades (i+1) each having a leading edge VK(i+1) and a trailing edge HK(i+1) in a meridional plane established by the axial direction (x) and the radial direction (r), where the blade row group has two main flow path boundaries (HB),
 wherein a blade profile of each of the blades (i, i+1) of the front and rear member blade rows is firmly connected at at least one of the two main flow path boundaries (HB) to a base (B(i), B(i+1)), where at least one blade profile of a blade (i, i+1) of one of the front and rear member blade rows extends beyond its base (B(i), B(i+1)), at least where the at least one blade profile of the blade (i, i+1) is firmly connected at at least one of the two main flow path boundaries (HB), and also protrudes onto the base (B(i), B(i+1)) of at least one blade (i, i+1) of the other of the front and rear member blade rows;
 wherein the base (B(i), B(i+1)) of at least one blade (i, i+1) of one of the front and rear member blade rows is a blade root, which is formed substantially by an extension of at least part of the blade profile beyond the at least one of the two main flow path boundaries (HB), where the bases (B(i), B(i+1)) of the blades (i, i+1) of the front and rear member blade rows are connected to one another.

2. The blade row group in accordance with claim 1, wherein at least one blade profile of a blade (i) of the front member blade row extends beyond its base (B(i)) in a flow direction and also protrudes onto the base (B(i+1)) of at least one blade (i+1) of the rear member blade row.

3. The blade row group in accordance with claim 1, wherein at least one blade profile of a blade (i+1) of the rear member blade row extends beyond its base (B(i+1)) against a flow direction and also protrudes onto the base (B(i)) of at least one blade (i) of the front member blade row.

4. The blade row group in accordance with claim 1, wherein the bases (B(i), B(i+1)) of two adjacent member blade rows adjoin one another along at least part of a circumference of the fluid-flow machine.

5. The blade row group in accordance with claim 1, wherein a front base edge (VBK(i+1)) of the rear base (B(i+1)) is provided axially upstream of a rear base edge HBK(i) of the front base (B(i)) along at least part of a circumference of the fluid-flow machine.

6. The blade row group in accordance with claim 1, wherein a gap (S) is provided between a projecting part (X) of the blade profile of the one of the front and rear member blade rows and the base (B(i), B(i+1)) of the other of the front and rear member blade rows.

7. The blade row group in accordance with claim 6, wherein the projecting part (X) of the blade profile of the one of the front and rear member blade rows is in contact with the base (B(i), B(i+1)) of the other of the front and rear member blade rows, and no gap is provided between the projecting part (X) and the base (B(i), B(i+1)) of the other of the front and rear member blade rows.

8. The blade row group in accordance with claim 1, wherein a rear base edge HBK(i) of the front base (B(i)) and a front base edge VBK(i+1) of the rear base (B(i+1)) extend along at least part of a circumference of the fluid-flow machine with a constant axial position.

9. The blade row group in accordance with claim 8, wherein the base (B(i), B(i+1)) of at least one of the two member blade rows has a parallelogram shape or a rectangular shape.

10. The blade row group in accordance with claim 1, wherein a rear base edge (HBK(i)) of the front base (B(i)) and a front base edge (VBK(i+1)) of the rear base (B(i+1)) extend along at least part of a circumference of the fluid-flow machine with a variable axial position.

11. The blade row group in accordance with claim 1, wherein at least one chosen from a front base edge (VBK(i)) of the front base (B(i)) and a rear base edge (HBK(i+1)) of the rear base (B(i+1)) extend in a circumferential direction completely with a constant axial position.

12. The blade row group in accordance with claim 1, wherein a course of at least one chosen from a rear base edge HBK(i) of the front base (B(i)) and a front base edge VBK(i+1) of the rear base (B(i+1)) follows a polygonal line or a straight line.

13. The blade row group in accordance with claim 1, wherein at least at one of the two main flow path boundaries (HB), the trailing edge (HK(i)) of a blade (i) of the front member blade row, in the meridional plane established by the axial direction x and the radial direction r, is arranged downstream of the leading edge (VK(i+1)) of a blade (i+1) of the rear member blade row.

14. The blade row group in accordance with claim 1, wherein, at least at one of the two main flow path boundaries (HB), the trailing edge ((HK(i)) of a blade (i) of the front member blade row, in the meridional plane established by the axial direction x and the radial direction r, is arranged in a same axial position or upstream of the leading edge (VK(i+1)) of a blade (i+1) of the rear member blade row.

15. The blade row group in accordance with claim 1, wherein in a view perpendicular to a main flow path-side surface of at least one of the two main flow path boundaries (HB), the base (B(i)) of a blade (i) of the one of the front and rear member blade rows is at least partially embedded into the base (B(i+1)) of a blade (i+1) of the other of the front and rear member blade rows.

16. The blade row group in accordance with claim 1, wherein the base (B(i), B(i+1)) is formed by a single blade root or by a ring segment extending over a plurality of blades of at least one of the front and rear member blade rows or by a complete ring extending over all blades of at least one of the front and rear member blade rows.

17. The blade row group in accordance with claim 1, wherein, in a view looking onto a main flow path-side surface of the respective main flow path boundary, the base (B(i)) of the blades (i) of the front member blade row has a front base edge (VBK(i)) and a rear base edge (HBK(i)) and the base (B(i+1)) of the blades (i+1) of the rear member blade row has a front base edge (VBK(i+1)) and a rear base edge (HBK(i+1)).

18. The blade row group in accordance with claim 1, wherein the bases (B(i), B(i+1)) of the front and rear member blade rows, in a plane established by the meridional coordinate (m) and the circumferential coordinate (u), each have an extent greater than the extension of the at least part of the blade profile.

19. A blade row group arrangeable in a main flow path of a fluid-flow machine, comprising:
   a quantity N of adjacent member blade rows firmly arranged relative to one another in both a meridional direction (m) and a circumferential direction (u), with the quantity N of the member blade rows being greater than or equal to 2 and (i) designating an index notation with values between 1 and N,
   the quantity N of adjacent member blade rows including a front member blade row with front blades (i) each having a leading edge VK(i) and a trailing edge HK(i) as well as a rear member blade row with rear blades (i+1) each having a leading edge VK(i+1) and a trailing edge HK(i+1) in a meridional plane established by the axial direction (x) and the radial direction (r), where the blade row group has two main flow path boundaries (HB),
   wherein a blade profile of each of the blades (i, i+1) of the front and rear member blade rows is firmly connected at at least one of the two main flow path boundaries (HB) to a base (B(i), B(i+1)), where at least one blade profile of a blade (i, i+1) of one of the front and rear member blade rows extends beyond its base (B(i), B(i+1)), at least where the at least one blade profile of the blade (i, i+1) is firmly connected at at least one of the two main flow path boundaries (HB), and also protrudes onto the base (B(i), B(i+1)) of at least one blade (i, i+1) of the other of the front and rear member blade rows;
   wherein a front base edge (VBK(i+1)) of the rear base (B(i+1)) is provided axially upstream of a rear base edge HBK(i) of the front base (B(i)) along at least part of a circumference of the fluid-flow machine.

20. A blade row group arrangeable in a main flow path of a fluid-flow machine, comprising:
   a quantity N of adjacent member blade rows firmly arranged relative to one another in both a meridional direction (m) and a circumferential direction (u), with the quantity N of the member blade rows being greater than or equal to 2 and (i) designating an index notation with values between 1 and N,
   the quantity N of adjacent member blade rows including a front member blade row with front blades (i) each having a leading edge VK(i) and a trailing edge HK(i) as well as a rear member blade row with rear blades (i+1) each having a leading edge VK(i+1) and a trailing edge HK(i+1) in a meridional plane established by the axial direction (x) and the radial direction (r), where the blade row group has two main flow path boundaries (HB),
   wherein a blade profile of each of the blades (i, i+1) of the front and rear member blade rows is firmly connected at at least one of the two main flow path boundaries (HB) to a base (B(i), B(i+1)), where at least one blade profile of a blade (i, i+1) of one of the front and rear member blade rows extends beyond its base (B(i), B(i+1)), at least where the at least one blade profile of the blade (i, i+1) is firmly connected at at least one of the two main flow path boundaries (HB), and also protrudes onto the base (B(i), B(i+1)) of at least one blade (i, i+1) of the other of the front and rear member blade rows;
   wherein a projecting part (X) of the blade profile of the one of the front and rear member blade rows is in contact with the base (B(i), B(i+1)) of the other of the front and rear member blade rows, and no gap is provided between the projecting part (X) and the base (B(i), B(i+1)) of the other of the front and rear member blade rows.

* * * * *